(12) United States Patent
O'Connor (10) Patent No.: US 11,661,551 B1
(45) Date of Patent: May 30, 2023

(54) BIOCHAR EXTRACTION APPARATUS

(71) Applicant: Air Burners, Inc., Palm City, FL (US)

(72) Inventor: Brian M. O'Connor, Palm City, FL (US)

(73) Assignee: AIR BURNERS, INC., Palm City, FL (US)

( * ) Notice: Subject to any disclaimer, the term of this patent is extended or adjusted under 35 U.S.C. 154(b) by 0 days.

(21) Appl. No.: 17/851,614

(22) Filed: Jun. 28, 2022

(51) Int. Cl.
| | |
|---|---|
| C10B 53/02 | (2006.01) |
| F23G 7/10 | (2006.01) |
| C10B 33/02 | (2006.01) |
| F23G 5/00 | (2006.01) |
| F23G 5/40 | (2006.01) |

(52) U.S. Cl.
CPC .............. C10B 33/02 (2013.01); C10B 53/02 (2013.01); F23G 5/002 (2013.01); F23G 5/006 (2013.01); F23G 5/40 (2013.01); F23G 7/10 (2013.01); *F23G 2203/80* (2013.01); *F23G 2209/261* (2013.01)

(58) Field of Classification Search
CPC ........ C10J 3/34; C10J 3/36; C10J 3/40; C10B 1/04; C10B 49/02; C10B 49/06; C10B 53/02; C10B 53/07; C10B 33/12; C10B 33/14; C10B 47/38; F23G 2203/101; F23G 2203/103; F23G 2203/105; F23G 2203/60; F23G 2203/601; F23G 1/165
See application file for complete search history.

(56) References Cited

U.S. PATENT DOCUMENTS

| | | | | | |
|---|---|---|---|---|---|
| 527,448 | A | * | 10/1894 | Richards | .................... F23H 7/08 110/281 |
| 527,593 | A | * | 10/1894 | Coxe | ......................... F23H 7/08 110/281 |
| 755,662 | A | * | 3/1904 | Hill | ......................... F23G 5/004 202/117 |
| 795,388 | A | * | 7/1905 | Googins | .................... F23H 7/08 110/165 R |
| 942,060 | A | * | 12/1909 | Elliott | ....................... F23H 7/06 110/165 R |

(Continued)

FOREIGN PATENT DOCUMENTS

CH 629582 A5 * 4/1982

OTHER PUBLICATIONS

PE2E translation of CH 629,582.*

*Primary Examiner* — Jonathan Luke Pilcher
(74) *Attorney, Agent, or Firm* — Hodgson Russ LLP (57) ABSTRACT

A biochar apparatus has a firebox for containing biomass to be incinerated to produce biochar, a pair of biomass supporting panels arranged in the firebox in a V-shaped configuration and separated by an extraction gap between lower edges of the panels, a roller system arranged to support at least one of the panels for rolling movement relative to the firebox, an actuator operable to move at least one of the panels relative to the firebox upon the roller system, and a conveyor system under the extraction gap, wherein pieces of the biochar pass through the extraction gap to the conveyor system, and the conveyor system is operable to convey and discharge the pieces of biochar. The panels may include refractory material capable of withstanding high temperatures associated with incineration of biomass in the firebox. These panels also protect the conveyor system and its components from incineration heat.

11 Claims, 10 Drawing Sheets

(56) References Cited

U.S. PATENT DOCUMENTS

| | | | | |
|---|---|---|---|---|
| 4,205,614 | A | * | 6/1980 | Good .................. F23G 5/46 |
| | | | | 110/259 |
| 4,285,282 | A | * | 8/1981 | Good .................. F23L 15/04 |
| | | | | 110/255 |
| 5,193,468 | A | * | 3/1993 | McRae .................. F23L 9/02 |
| | | | | 110/235 |
| 5,415,113 | A | | 5/1995 | Wheeler et al. |
| 6,536,360 | B2 | | 3/2003 | O'Connor |
| 7,004,088 | B2 | | 2/2006 | Ford |
| 7,063,027 | B2 | | 6/2006 | O'Connor |
| 7,354,557 | B2 | * | 4/2008 | Muramatsu ............ C10B 49/02 |
| | | | | 422/152 |
| 7,503,268 | B2 | | 3/2009 | O'Connor |
| 7,895,956 | B2 | | 3/2011 | O'Connor |
| 10,501,689 | B2 | | 12/2019 | Archuleta, Jr. et al. |
| 2022/0090783 | A1 | | 3/2022 | O'Connor et al. |

\* cited by examiner

BIOCHAR EXTRACTION APPARATUS

FIELD OF THE DISCLOSURE

This disclosure relates to an apparatus and process for converting biomass to biochar. The apparatus and process may be transported to and used at locations where biomass is produced, such as forestry and development sites.

BACKGROUND OF THE DISCLOSURE

Biomass waste generated at land clearing and lumbering sites is difficult and expensive to transport to other locations for processing, and unprocessed biomass takes up considerable space in landfills. Therefore, it is common to incinerate biomass at or near the site in open pits or in transportable fireboxes. To minimize the release of ash and particulates into the atmosphere during incineration of the biomass, "air curtain" fireboxes were developed in which a flow of high-velocity air is directed over a top region of the firebox to contain combustion products in the firebox and promote high-temperature incineration of the biomass. Examples of air curtain fireboxes are described in U.S. Pat. Nos. 5,415,113; 6,536,360; 7,004,088; 7,063,027; 7,503,268; and 7,895,596.

Biochar, an end product of incinerating biomass, is useful in agriculture to enhance soil fertility and water retention capacity. Biochar is also useful in animal feed or as a bio-based substitute for active carbon. U.S. Pat. No. 10,501,689 describes a mobile charcoal/biochar production and pelletizer system which automatically produces a pelletized biochar from biomass incinerated in a firebox of the system. In addition to the firebox, an embodiment of the system includes a grate arranged as a floor of the firebox to support biomass, a conveyor system under the grate, and a vertical shaker mechanism for moving the grate up and down to cause pieces of charcoal and biochar to fall through openings in the grate and onto a conveyor belt of the conveyor system. The conveyor system conveys the pieces of charcoal and biochar to an extruding compartment filled with water to quench and cool the pieces. An extruder in the extruding compartment forces the charcoal and biochar pieces out of the extruding compartment through extrusion ports, and a cutter slices the extruded material as it exits the extruding compartment to form pellets. The described system makes progress toward the goal of providing biochar in a convenient form for later use. However, use of a vertical shaker mechanism requires the entire grate to be vertically actuated by multiple actuators at different support locations on a periphery of the grate. Also, synchronized cooperation between the extruder and the conveyor system adds complexity to automated controls for these features, and there is a risk of that discharge of hot biochar from the conveyor system will become blocked if the extruder malfunctions or functions too slowly. More generally, the disclosure of U.S. Pat. No. 10,501,689 does not provide a solution whereby an existing firebox may be retrofitted to produce transportable biochar pieces for agricultural and other uses.

U.S. Patent Application Publication No. 2022/0090783-A1 by the present applicant discloses an incineration apparatus for producing biochar from biomass which improves upon the apparatus disclosed in U.S. Pat. No. 10,501,689 by providing a cyclical shaker mechanism operable to move the grate table in a horizontal plane relative to the firebox to cause pieces of biochar to pass through openings in the grate table to a conveyor system below. According to the disclosure, the table may include a table frame and a plurality of grate panels each removably supported by the table frame, whereby damaged or worn grate panels may be replaced and/or a size of the table openings may be selectively modified. The disclosed apparatus may further comprise a channel between the table and the conveyor system having a tapered inner wall arranged to cover at least one of a drive pulley and an idler pulley of the conveyor system and guide the pieces of biochar toward a conveyor belt of the conveyor system. The applicant herein has found that for some uses, the grate table and conveyor system disclosed in US 2022/0090783-A1 have difficulty withstanding the heat generated during incineration of biomass, and significant ongoing maintenance of the apparatus may be required to keep the apparatus functioning properly.

Therefore, an improved apparatus for extracting biochar from an incineration firebox is needed.

SUMMARY OF THE DISCLOSURE

The present disclosure provides various apparatuses and processes for producing biochar from raw biomass. The biochar may be used for agricultural purposes to enhance soil fertility and water retention capacity. The biochar may also be used in animal feed or as a bio-based substitute for active carbon.

In one embodiment, a biochar apparatus generally comprises a firebox for containing biomass to be incinerated to produce biochar, a pair of biomass supporting panels arranged in the firebox in a V-shaped configuration and separated by an extraction gap between lower edges of the panels, a roller system arranged to support at least one of the panels for rolling movement relative to the firebox, an actuator operable to move at least one of the panels relative to the firebox upon the roller system, and a conveyor system under the extraction gap, wherein pieces of the biochar pass through the extraction gap to the conveyor system, and the conveyor system is operable to convey and discharge the pieces of biochar from the conveyor system. The panels may include refractory material capable of withstanding high temperatures associated with incineration of biomass in the firebox. These panels also help keep heat off the conveyor system and its components.

In another embodiment, the biochar apparatus summarized above further comprises a quenching reservoir pan adjacent a discharge end of the conveyor system for containing a quenching liquid, and a drainage basket removably received by the quenching reservoir pan. The conveyor system is operable to convey pieces of biochar and discharge the pieces of biochar from the conveyor system to the drainage basket and the quenching reservoir pan.

A process for producing pieces of biochar generally comprises incinerating biomass in a firebox to produce biochar, wherein the biomass is supported in the firebox by first and second panels including respective upwardly facing panel surfaces converging downwardly toward one another, wherein the panel surfaces are separated by an extraction gap between the panels; moving at least the first panel relative to the firebox to cause pieces of the biochar to fall through the extraction gap; and automatically conveying the pieces of biochar relative to the firebox. The panels may include refractory material capable of withstanding high temperatures associated with incineration of biomass in the firebox.

BRIEF DESCRIPTION OF THE DRAWINGS

The nature and mode of operation of the present disclosure will now be more fully described in the following detailed description taken with the accompanying drawing figures, in which.

DETAILED DESCRIPTION OF THE INVENTION

A transportable biochar apparatus 10 according to an embodiment of the present disclosure is now described with reference to FIGS. 1-10. Biochar apparatus 10 comprises a firebox 12 for containing biomass to be incinerated to produce biochar. Apparatus 10 also comprises a first panel 14A and a second panel 14B arranged to support biomass contained in firebox 12, and a conveyor system 16 located under first and second panels 14A, 14B. Apparatus 10 may further comprise a roller system 17 arranged to support first panel 14A and/or second panel 14B for rolling movement relative to firebox 12, and an actuator 18 connected to first panel 14A and/or second panel 14B.

Firebox 12 may be a rectangular firebox having a pair of longitudinal side walls 20 connected by a transverse front wall 21 and a transverse rear wall 22 cooperating to define a combustion chamber 23. Each wall 20, 21, and 22 is lined on the inside with a layer of thermo-ceramic refractory material in the form of refractory panels 24 to provide thermal insulation while biomass is being incinerated within firebox 12. Refractory panels 24 may be held in place by steel framing. In the illustrated embodiment, firebox 12 has a central longitudinal axis 13 midway between opposite lateral side walls 20 of the firebox.

Firebox 12 may be equipped with an air curtain system 26. Air curtain system 26 may include a manifold assembly 28 mounted to extend along the top edge of one of the side walls 20, and a fan 30 operable to supply high velocity air flow to manifold 28 by way of a duct 29. Fan 30 may be a centrifugal fan or other type of fan or blower. Fan 30 may be driven by an internal combustion engine 32, for example a diesel engine, that is connected to a fuel tank 34. Alternatively, fan 30 may be driven by an electric motor or a hydraulic motor. Manifold 28 may be generally tubular, and may include a plurality of air discharge nozzles 36 arranged along the length of manifold 28 for directing an effective sheet or curtain of high velocity air across and slightly downward into combustion chamber 23. By way of non-limiting example, the BURNBOSS® air curtain burner commercially available from Air Burners, Inc. of Palm City, Fla. includes a firebox and associated air curtain system suitable for practicing the present disclosure.

Figure 6:
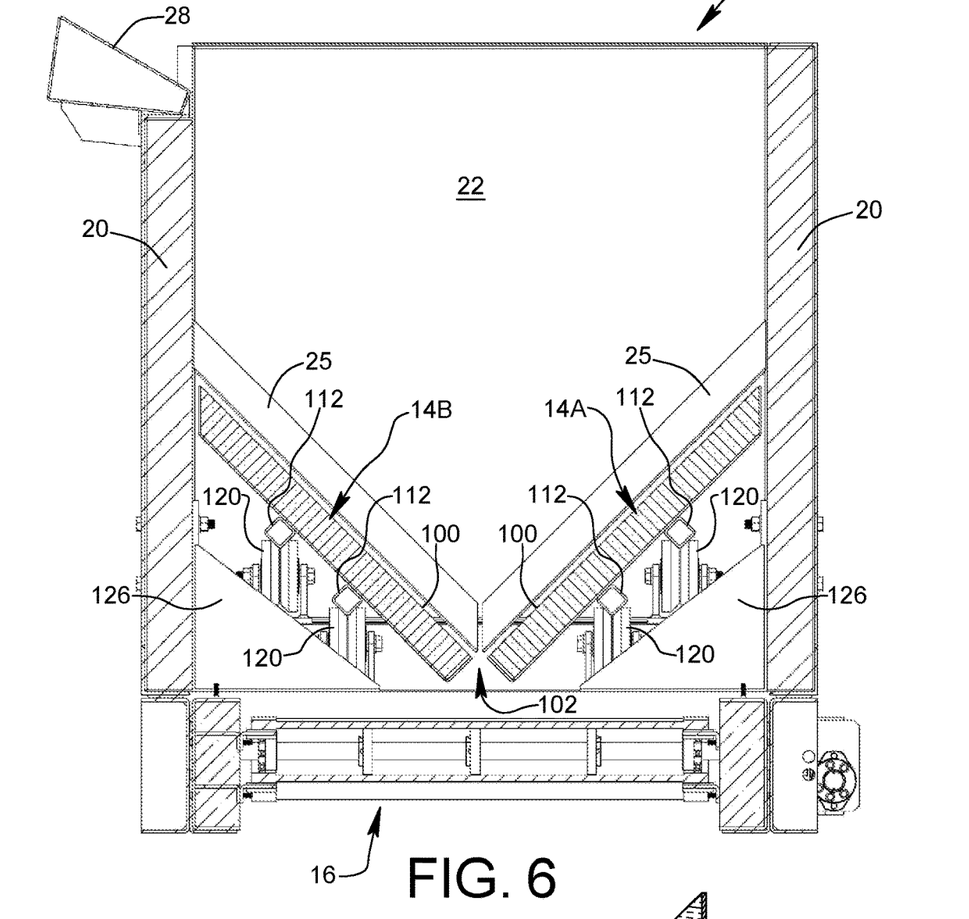
FIG. 6 is a lateral cross-sectional view of the firebox and conveyor system assembly shown in FIG. 3.
Figure 7:
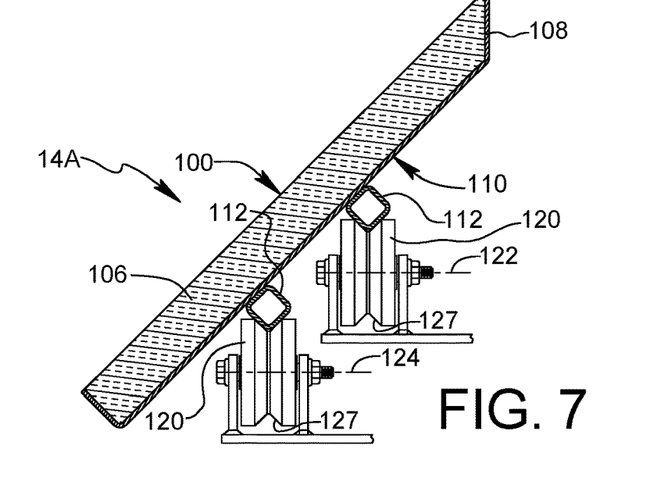
FIG. 7 is an enlarged view based on the lateral cross-sectional view of FIG. 6, showing a biomass supporting panel mounted on a roller system of the biochar apparatus.
Figure 8:
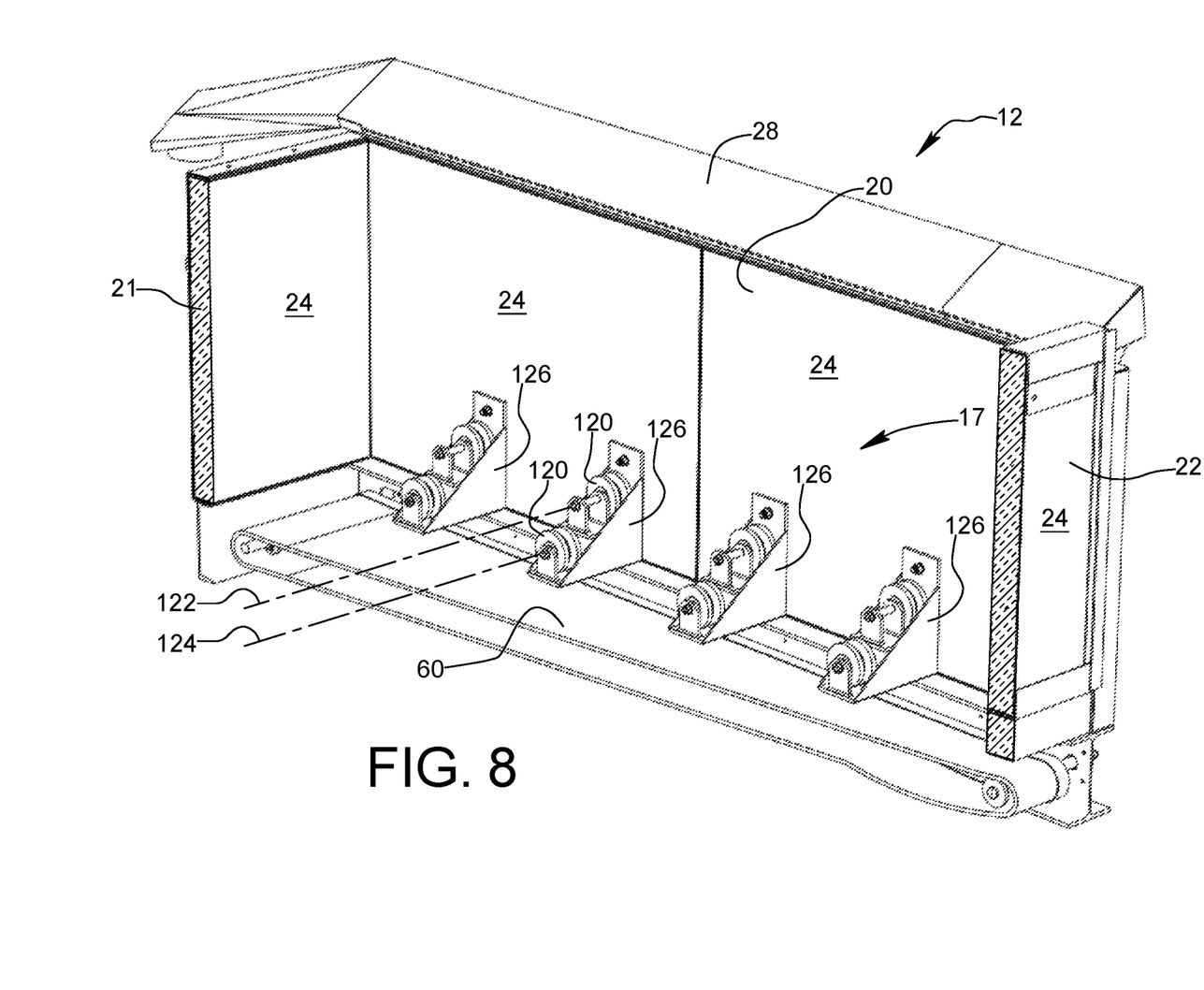
FIG. 8 is a sectioned perspective view of the firebox and conveyor system assembly shown in FIG. 3, wherein biomass support panels in the firebox are removed to reveal a roller system of the biochar apparatus.
Figure 9:
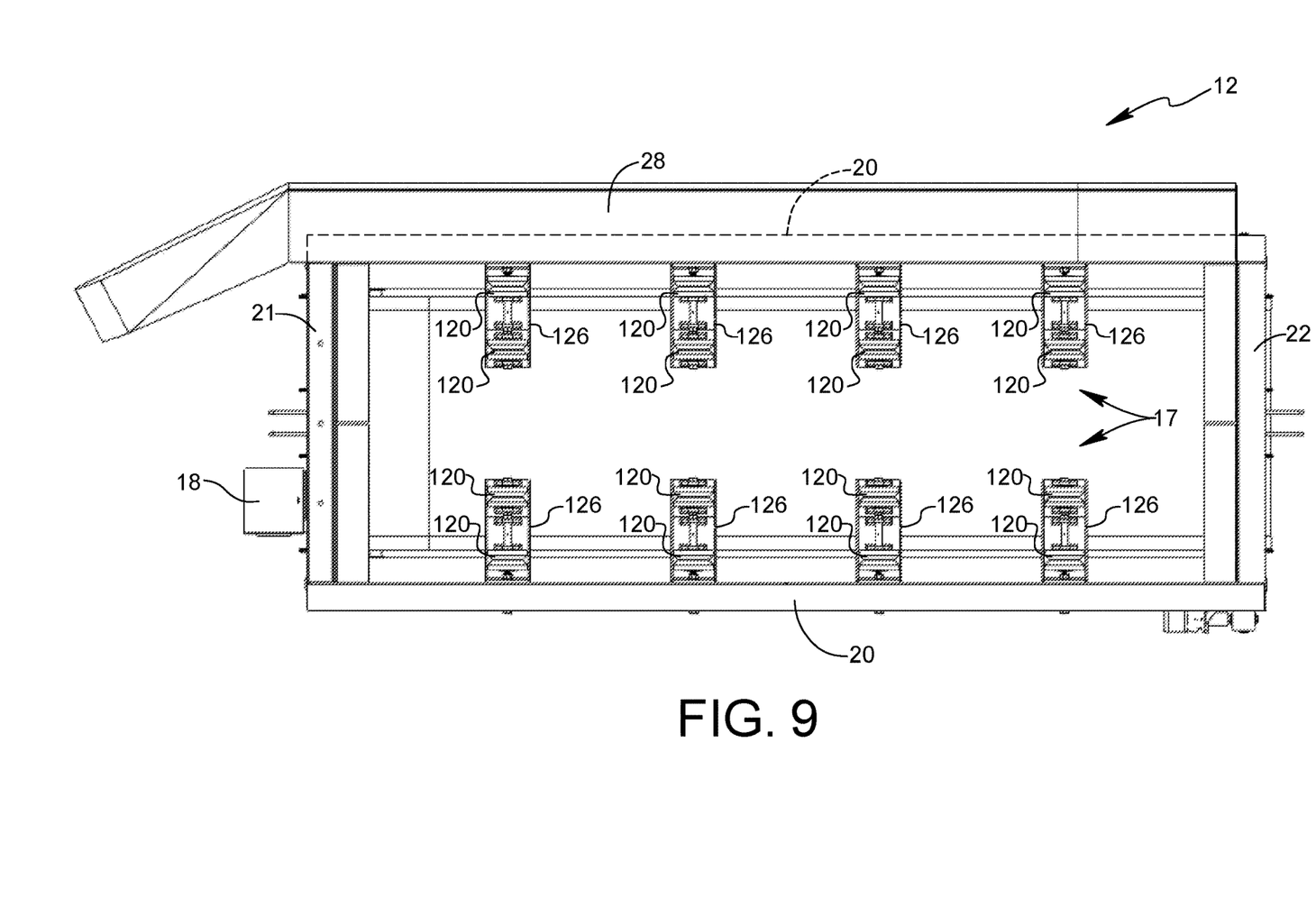
FIG. 9 is another top plan view of the firebox, wherein the biomass support panels are removed.

First and second panels 14A, 14B may be arranged in firebox 12 in a lower region of combustion chamber 23 to support biomass contained in the firebox. Each of the first and second panels 14A, 14B may include an upwardly facing panel surface 100. As best seen in FIG. 6, the respective panel surfaces 100 converge downwardly toward one another and are separated by an extraction gap 102 between respective bottom edges 104 of panel surfaces 100. First and second panels 14A, 14B may be arranged such that extraction gap 102 is elongated in a longitudinal direction of firebox 12. For example, extraction gap 102 may extend along the central longitudinal axis 13 of firebox 12 situated midway between lateral side walls 20 of the firebox. Extraction gap 102 allows pieces of the biochar resulting from incinerated biomass to pass between panels 14A, 14B to conveyor system 16 under force of gravity. The applicant has found that a suitable width for extraction gap 102 is approximately one inch (i.e., 1±0.125 inches), however, extraction gap 102 may be wider or narrower than approximately one inch, or may have a varying width over its longitudinal extent.

In an aspect of the present disclosure, each of the panels 14A, 14B may include thermos-ceramic refractory material 106 defining the corresponding panel surface 100. Panels 14A, 14B having refractory material 106 are able to withstand the heat generated by incinerating biomass, and are arranged to protect conveyor system 16 and its components from the heat generated by incinerating biomass. As a result, longevity of biochar apparatus 10 is increased, and downtime and cost associated with repair or replacement of components is reduced.

Refractory material 106 may be received and held by an outer shell 108 having an open top. Outer shell 108 may be fabricated, for example, from steel plate material. Each of the panels 14A, 14B may be constructed using one or more slabs 114 of refractory material 106 held by outer shell 108. Where more than one slab 114 of refractory material 106 is used to form a panel 14A or 14B, the slabs may be arranged end-to-end, and outer shell 108 may include an intermediate partition 109 between two adjacent slabs, such that the panel moves as a unit relative to firebox 12.

In the illustrated embodiment, upwardly facing panel surfaces 100 are configured as planar surfaces. However, upwardly facing panel surfaces 100 may be curved toward extraction gap 102, or may have a plurality of differently sloped planar regions inclined toward extraction gap 102.

Each of the panels 14A, 14B may further include a downwardly facing undersurface 110 and a plurality of elongated ribs 112 fixed to undersurface 110. For example, undersurface 110 may be defined by an external surface of outer shell 108, and ribs 112 may be welded to undersurface 110. In the illustrated embodiment, ribs 112 are lengths of rectangular tubing, for example structural steel tubing, having one face in surface-to-surface engagement with the undersurface 110 to which the rib 112 is fixed. However, ribs 112 may be embodied by any suitable elongated members fixed to undersurface 110, or by elongated grooves or recesses in the external wall of outer shell 108 that defines undersurface 110.

Roller system 17 may include a plurality of rollers 120 mounted to rotate about a plurality roller axes including a horizontally extending first roller axis 122 at a first height within firebox 12 and a horizontally extending second roller axis 124 at a second height within firebox 12 different from the first height. As may be understood, the plurality of rollers 120 may comprise a first set of rollers rotatable about first roller axis 122 and a second set of rollers rotatable about second roller axis 124. Roller system 17 may have a plurality of roller support brackets 126, wherein each roller support bracket 126 supports a roller 120 from the first set of rollers and a roller 120 from the second set of rollers. Several roller brackets 126 may be attached to and spaced along a side wall 20 of firebox 12. In the embodiment shown, both panels 14A, 14B are supported by roller system 17, and thus roller brackets 126 are attached to both side walls 20. However, roller system 17 may be configured to support only one of the panels 14A, 14B by providing roller brackets 126 along only one of the side walls 20, and the other panel may be supported by simple support brackets (i.e., brackets without rollers) attached to the other side wall 20. Rollers 120 and roller brackets 126 may be made from a material capable of withstanding high heat levels associated with biomass incineration, such as steel or other metals.

The plurality of ribs 112 may be engaged by roller system 17 to support the associated panel 14A, 14B for rolling movement relative to firebox 12. Each of the rollers 120 may include a circumferential groove 127, and each rib 112 may be received by the circumferential grooves 127 of an aligned series of rollers 120, whereby the corresponding panel 14A, 14B is guided for longitudinally directed rolling movement relative to firebox 12. As exemplified by the illustrated embodiment, each panel undersurface 110 may be a planar surface inclined at 45° relative to horizontal, the ribs 112 fixed thereto may be rectangular in cross-section, and circumferential grooves 127 may be V-shaped to receive a corner of one of the ribs 112. As may be appreciated, the illustrated support configuration is easy and inexpensive to fabricate from off-the-shelf structural steel shapes and commercially available rollers.

Roller axes 122 and 124 may extend laterally across firebox 12, and ribs 112 may extend parallel to the longitudinal axis 13 of firebox 12, whereby the panels 14A, 14B are guided for movement back and forth (i.e. longitudinally) a short distance within the firebox. Alternatively, panels 14A, 14B may be arranged and inclined such that extraction gap 102 extends in a transverse direction across firebox 12, roller axes 122 and 124 may extend longitudinally along firebox 12, and ribs 112 may extend transversely across firebox 12 parallel to the extraction gap, whereby the panels 14A, 14B are guided for movement side-to-side (i.e. transversely) a short distance within the firebox.

Actuator 18 is connected to at least one of the panels 14A, 14B and is operable to move the connected panel or panels relative to firebox 12 upon roller system 17. In the exemplary embodiment of FIGS. 1-10, only the first panel 14A is connected to actuator 18, wherein actuator 18 is operable to move first panel 14A relative to firebox 12 with the aid of roller system 17. Actuator 18 may move first panel 14A back and forth in a cyclical manner to cause biochar within combustion chamber 23 to break up into smaller pieces and fall through extraction gap 102 onto conveyor system 16 located under the extraction gap.

Figure 10:
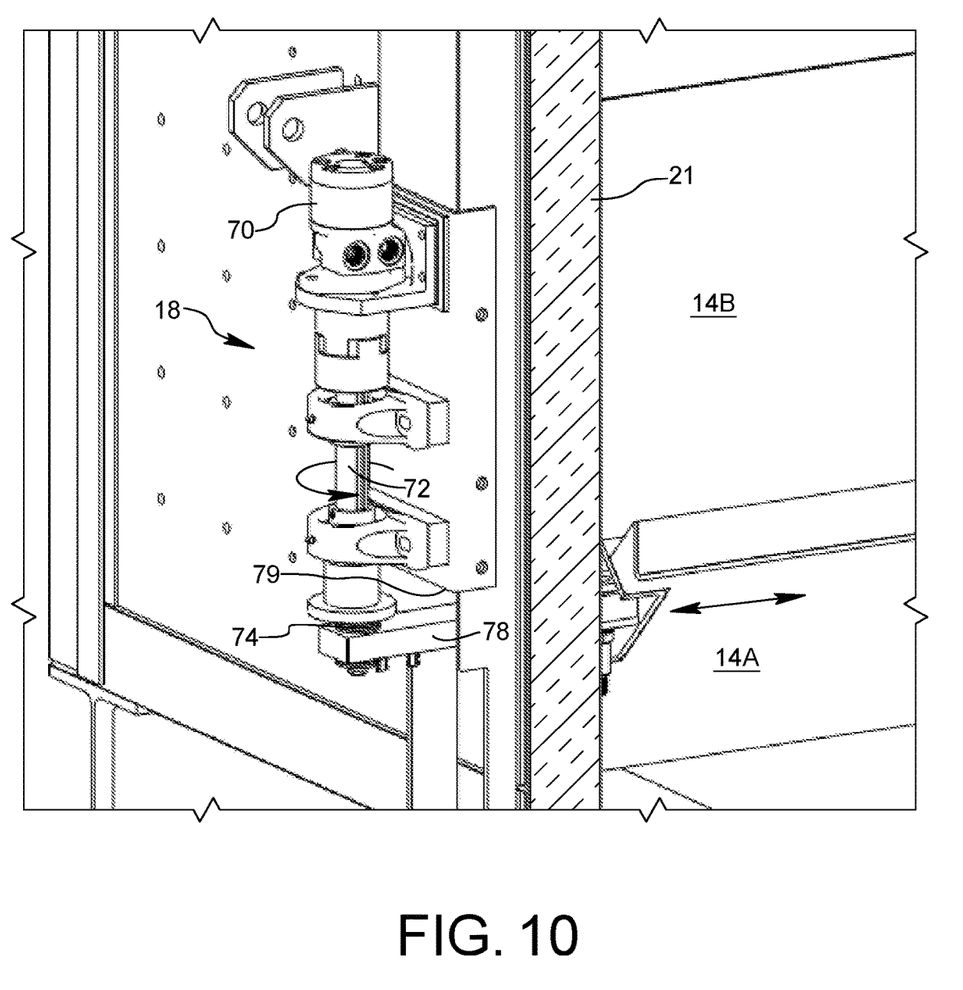
FIG. 10 is a sectioned perspective view showing a panel actuator of the biochar apparatus shown in FIG. 1.

Actuator 18 may include a drive motor 70, a drive shaft 72 rotated by drive motor 70, a cam 74 coupled to drive shaft 72 for rotation with the drive shaft, and a transmission member 78 engaged by cam 74 and arranged to transmit motion from cam 74 to first panel 14A. Cam 74 may be eccentrically arranged with respect to a rotational axis of drive shaft 72, and may be received within a cam recess in transmission member 78 such that rotation of drive shaft 72 and cam 74 causes transmission member 78 to oscillate. As illustrated in FIG. 10, the oscillating motion of cam follower 76 may be in a horizontal plane, and the rotational axis of drive shaft 72 may be vertical. In an alternative arrangement, drive motor 70, drive shaft 72, and cam 74 may be rotated by ninety degrees from the orientation shown in FIG. 10 such that the rotational axis of the drive shaft 72 is horizontal yet remains orthogonal to the rolling travel axis of first panel 14A.

Transmission member 78 may extend through a passage 79 in the front wall 21 of firebox 12, and may have one end connected to cam 74 and another end connected to outer shell 108 of first panel 14A. Accordingly, when drive motor 70 is operated, actuator 18 may transmit a reciprocating horizontal stroke to first panel 14A in a longitudinal direction of firebox 12. For example, the reciprocating horizontal stroke (i.e., the total travel distance rearward and forward in a complete cycle) may be in a range from one inch through two inches. Steel retaining members 25 may be fixed to the interior surface of front wall 21 and rear wall 22 just above first panel 14A and second panel 14B to keep the panels 14A, 14B in place on roller system 17 as biochar apparatus 10 travels over bumpy terrain. By driving first panel 14A in a horizontal reciprocating motion, the present disclosure avoids forces and mechanisms acting on first panel 14A in synchronous fashion at multiple locations, which is a drawback of providing vertical reciprocating motion.

As an alternative to the rotationally driven actuator 18 described above, a hydraulic linear actuator or an electromechanical linear actuator may be connected to first panel 14A to transmit a reciprocating horizontal stroke to first panel 14A in the longitudinal direction of firebox 12.

Figure 11:
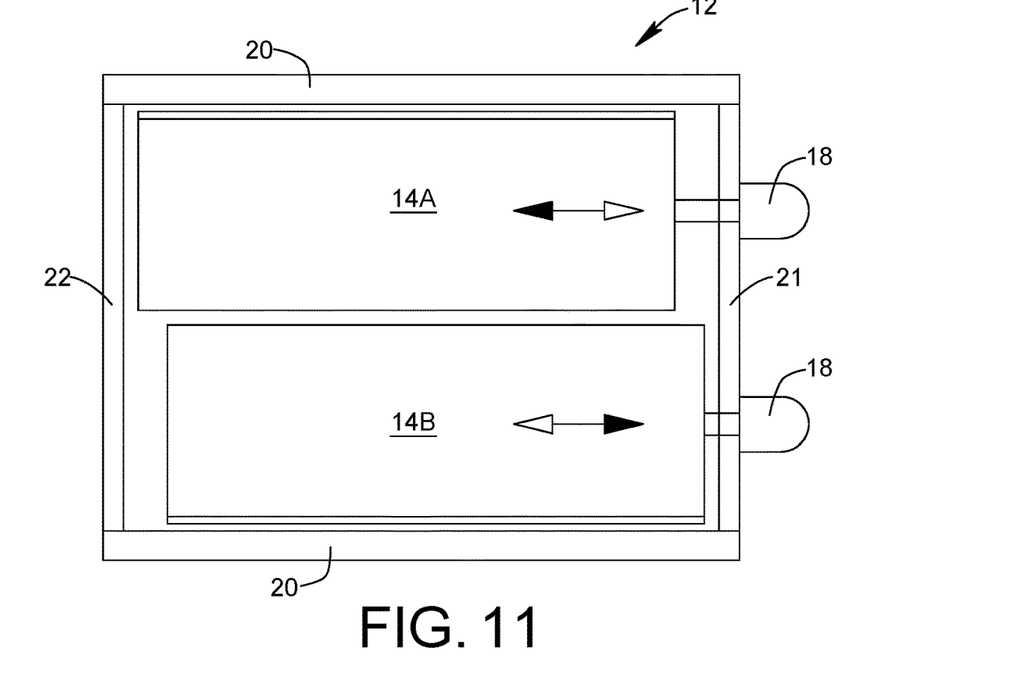
FIG. 11 is a schematic diagram illustrating a variation of the biochar apparatus having more than one panel actuator.

In a first variation illustrated schematically in FIG. 11, biochar apparatus 10 may have a pair of actuators 18 connected to first panel 14A and second panel 14B, respectively. Each actuator 18 is operable to move the connected panel 14A or 14B relative to firebox 12 upon roller system 17. Actuators 18 may be driven with a phase differential such that as first panel 14A is moved in one direction by one of the actuators, second panel 14B is moved in an opposite direction by the other actuator. This variation using two actuators 18 provides redundancy in the drive system such that if one of the actuators 18 malfunctions or fails, biochar apparatus 10 may nevertheless continue to operate with one moving panel instead of two moving panels. This variation also doubles the speed and distance of relative motion between first panel 14A and second panel 14B, thereby increasing the cyclical action which causes biochar to break up into smaller pieces and fall through extraction gap 102.

Figure 12:
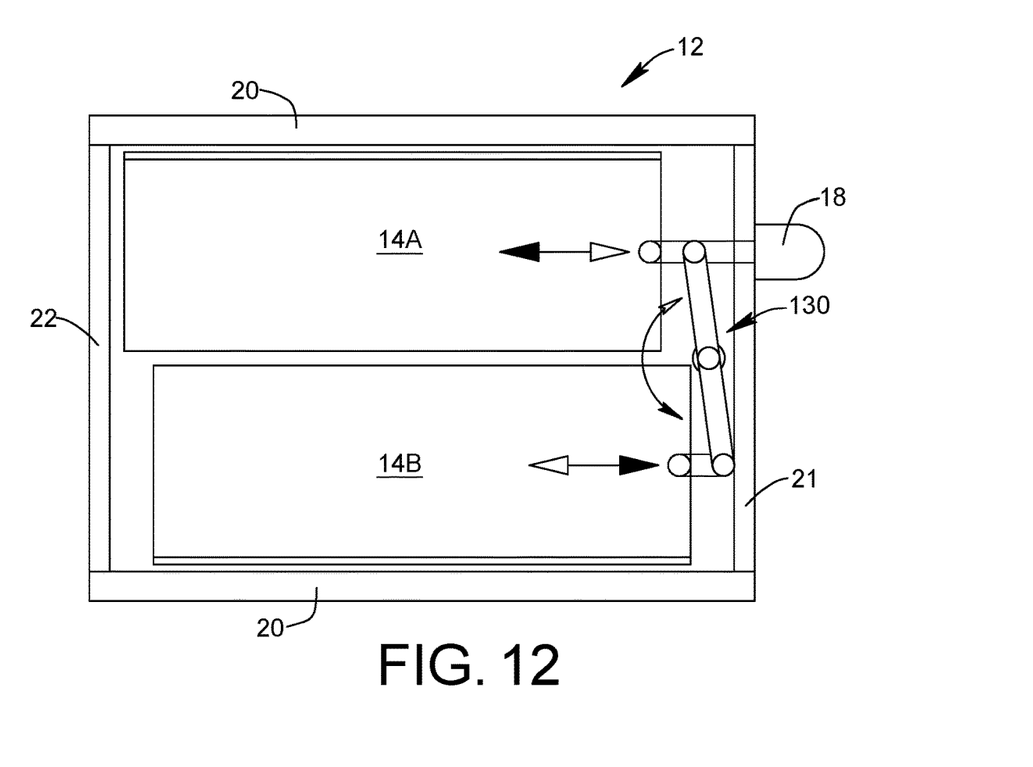
FIG. 12 is a schematic diagram illustrating a variation of the biochar apparatus having a single panel actuator connected to a pair of biomass support panels.

FIG. 12 schematically illustrates a second variation of the biochar apparatus having a single actuator 18 connected to first panel 14A and second panel 14B by a linkage 130. Linkage 130 may be configured in the manner of a pivoting lever or bell crank mechanism such that as first panel 14A is moved in one direction by actuator 18, second panel 14B is moved in an opposite direction by the same actuator acting through linkage 130. Like the first variation described above, the second variation also doubles the speed and distance of relative motion between first panel 14A and second panel 14B, thereby increasing the cyclical action which causes biochar to break up into smaller pieces and fall through extraction gap 102.

Conveyor system 16 is operable to convey the pieces of biochar which fall through extraction gap 102 and discharge the pieces of biochar from the conveyor system 16 at a discharge end 52 of the conveyor system. Conveyor system 16 may be arranged to discharge the pieces of biochar from discharge end 52 of the conveyor system to a quenching reservoir, an embodiment of which is described below, for cooling the pieces of biochar.

Conveyor system 16 may comprise a conveyor drive motor 54, a drive pulley 56 driven to rotate by conveyor drive motor 54, an idler pulley 58 spaced from drive pulley 56, and a conveyor belt 60 engaged by drive pulley 56 and idler pulley 58. Conveyor belt 60 is located under extraction gap 102 to receive falling pieces of biochar. In the illustrated example embodiment, drive pulley 56 may be arranged at discharge end 52 of conveyor system 16, and may be connected to drive motor 54 by way of a gearbox 62. Pulleys 56 and 58 may extend transversely between opposite support beams 64 of conveyor system 16, wherein opposite ends of each pulley are rotatably supported by bearings in support beams 64. As may be understood, the rotational axis of drive pulley 56 and the rotational axis of idler pulley 58 extend horizontally parallel to one another and are spaced apart in a longitudinal direction from the front of firebox 12 to the rear of firebox 12. Conveyor belt 60 may be a continuous conveyor belt having chains on each side engaged by sprockets on pulleys 56 and 58, such that when drive pulley 56 is rotated by drive motor 54 the conveyor belt 60 continuously proceeds from a front end of conveyor system 16 associated with the front wall 21 of firebox 12 toward the discharge end 52 of conveyor system 16 associated with the rear wall 22 of firebox 12. The material used to form conveyor belt 60 between its side chains may be a compliant metal mesh material designed to withstand high temperatures.

The support beams 64 may be arranged to extend under the opposite side walls 20 of firebox 12 for supporting the firebox above conveyor system 16 when the conveyor system 16 and firebox 12 are situated on the ground at a biomass clearing site. A front crossbeam 65 may extend transversely to the longitudinal support beam 64 and provide further support under the front wall 21 of firebox 12. Conveyor system 16 may further include inner thermal walls 66 respectively arranged adjacent to the support beams 64. Inner thermal walls 66 may have a layer of thermo-ceramic refractory material formed by one or more refractory panels 68 to provide thermal insulation while biomass is being incinerated within firebox 12 and pieces of biochar are being conveyed by conveyor system 16. Refractory panels 68 may be held in place by steel framing of wall 66, which framing may be fixed to an associated support beam 64 by bolting and/or welding. Crossbeam 65 may also have a layer of thermo-ceramic refractory material along its inner side. Upper and lower belt guides 69 may be attached to each of the inner thermal walls 66 for guiding conveyor belt 60 along its longitudinal upper and lower extents.

Figure 1:
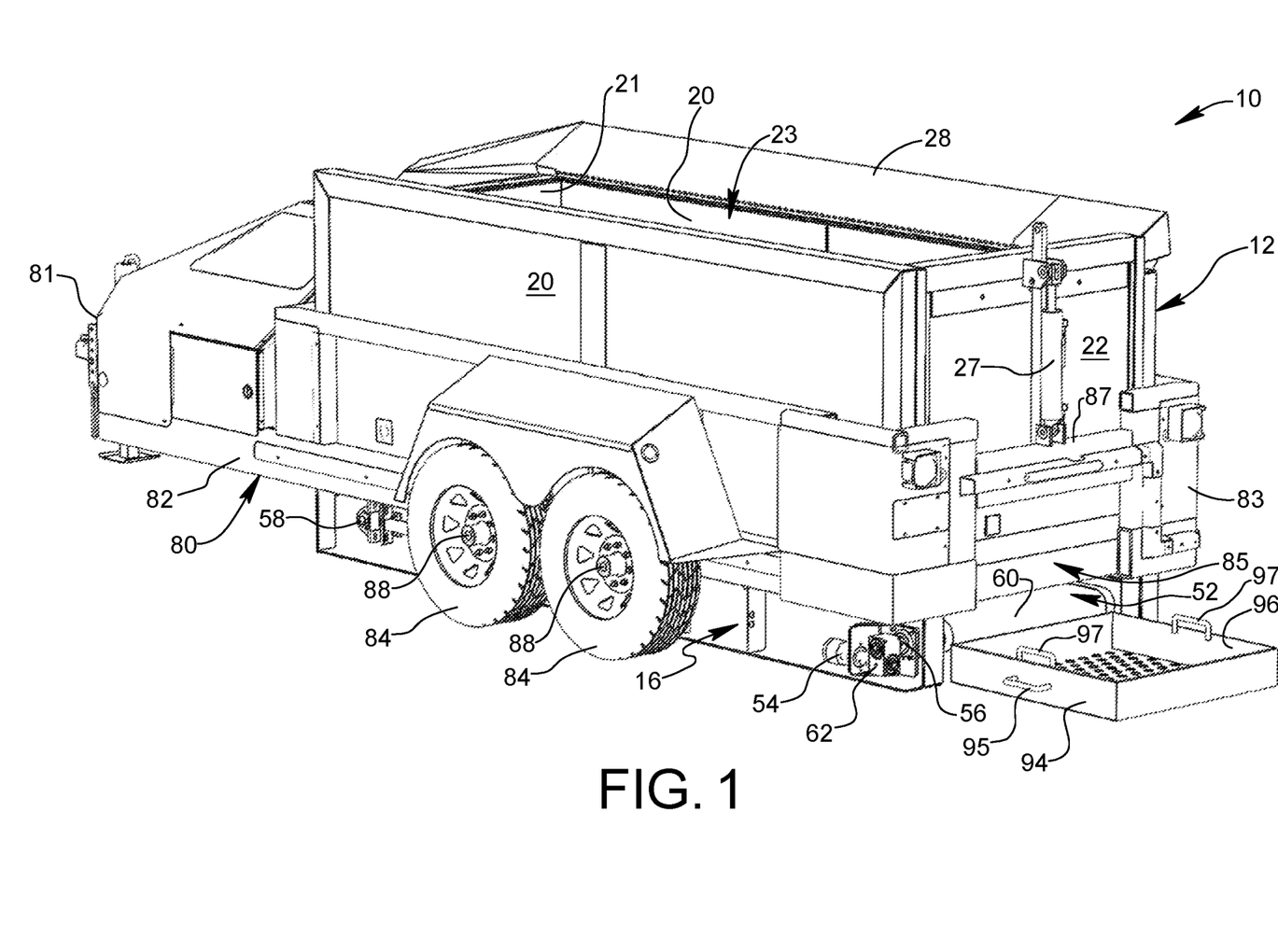
FIG. 1 is perspective view of a portable biochar apparatus formed in accordance with an embodiment of the present disclosure.
Figure 2:
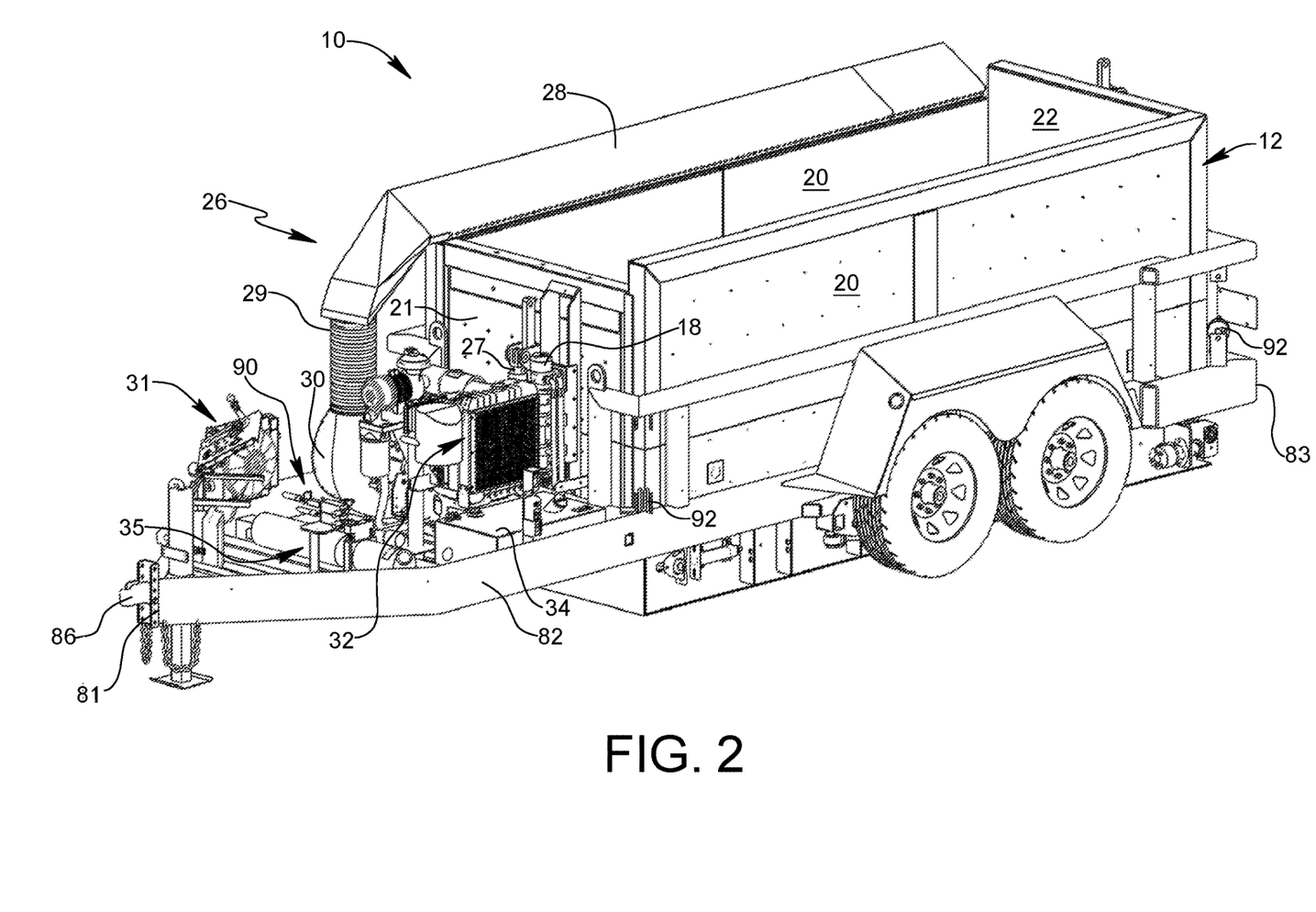
FIG. 2 is another perspective view of the portable biochar apparatus shown in FIG. 1, wherein a cover of a chassis of the apparatus is removed to reveal internal structure.
Figure 3:
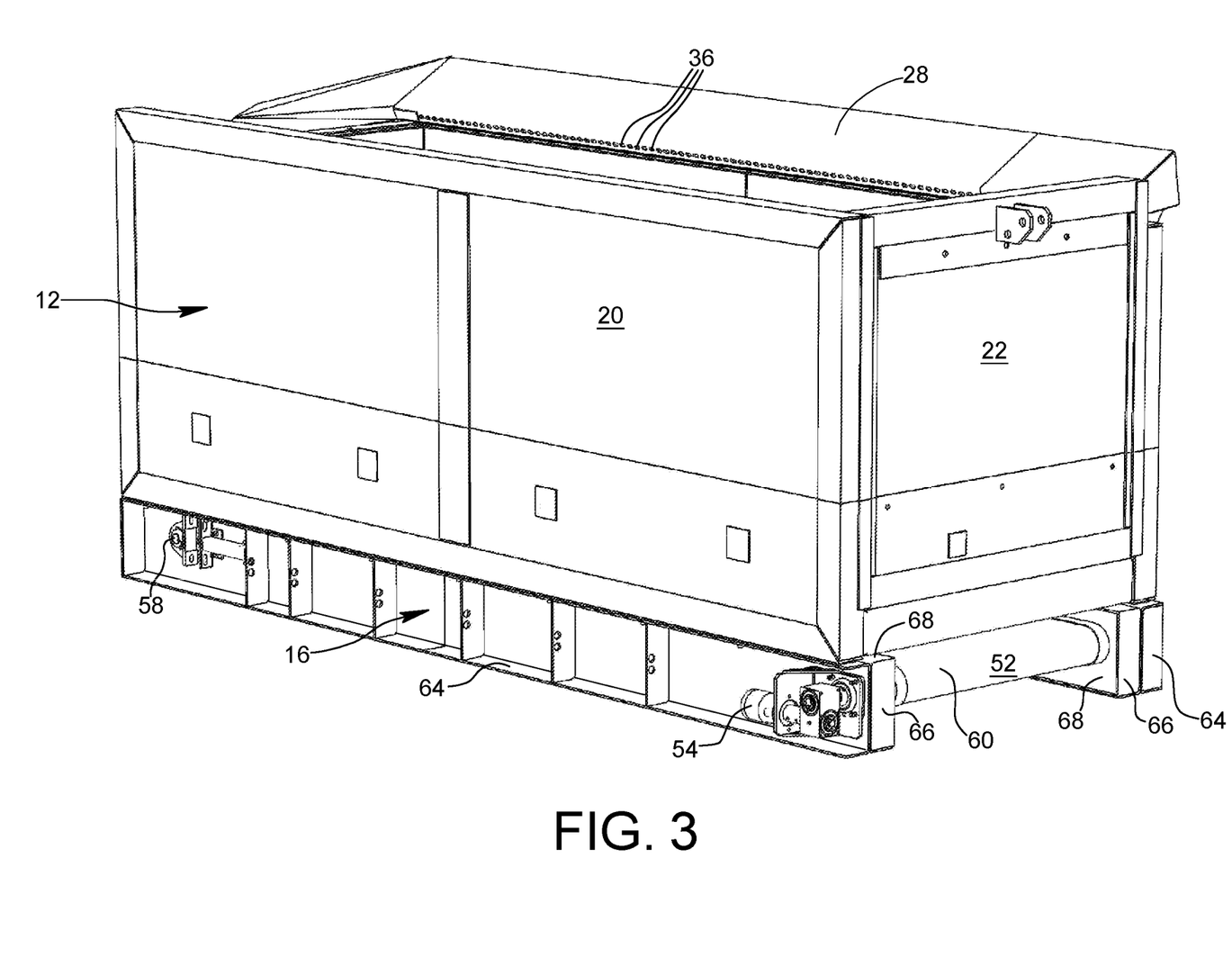
FIG. 3 is a perspective view of a firebox and conveyor system assembly of the biochar apparatus.
Figure 4:
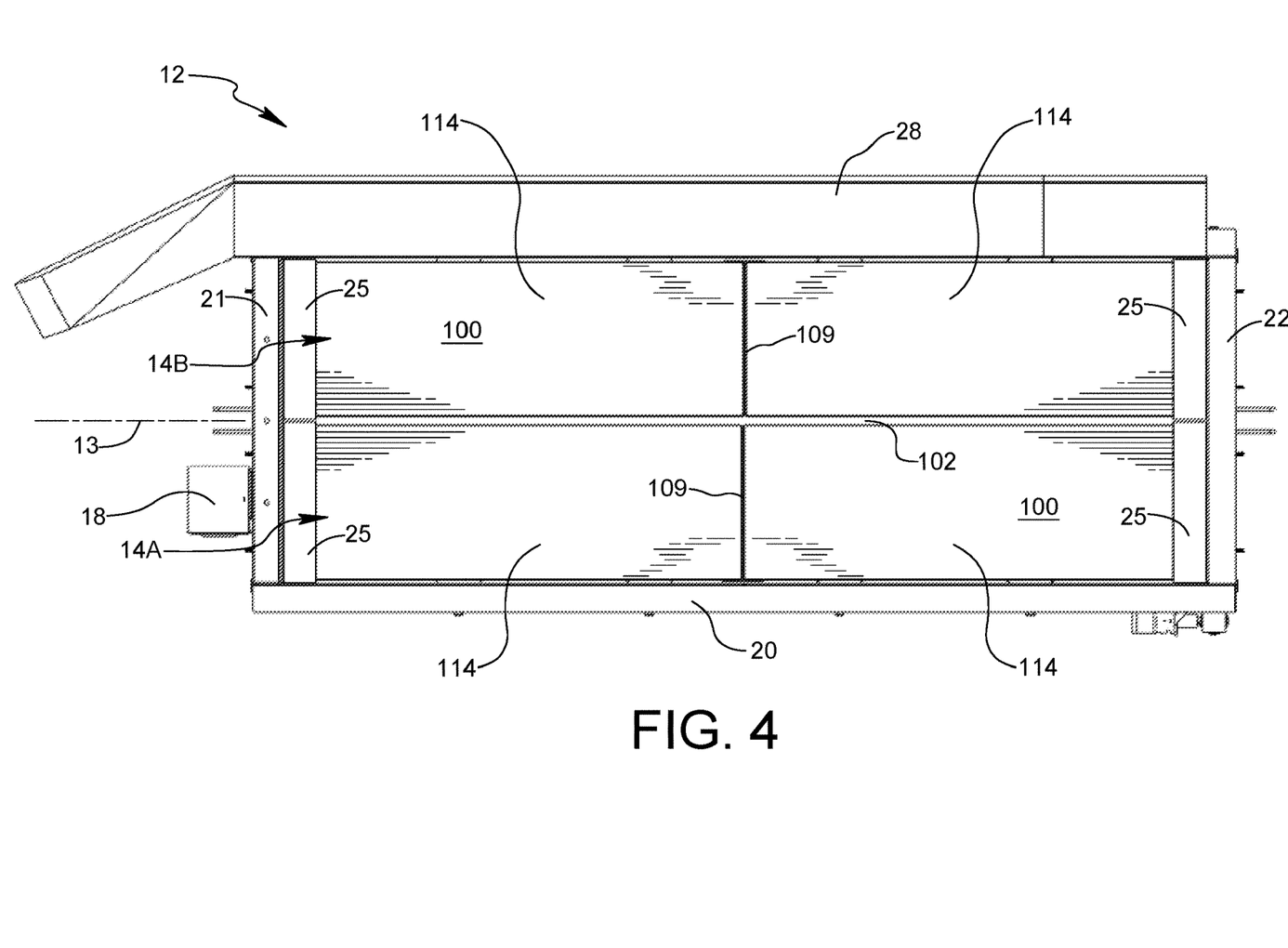
FIG. 4 is a top plan view of the firebox shown in FIG. 3.
Figure 5:
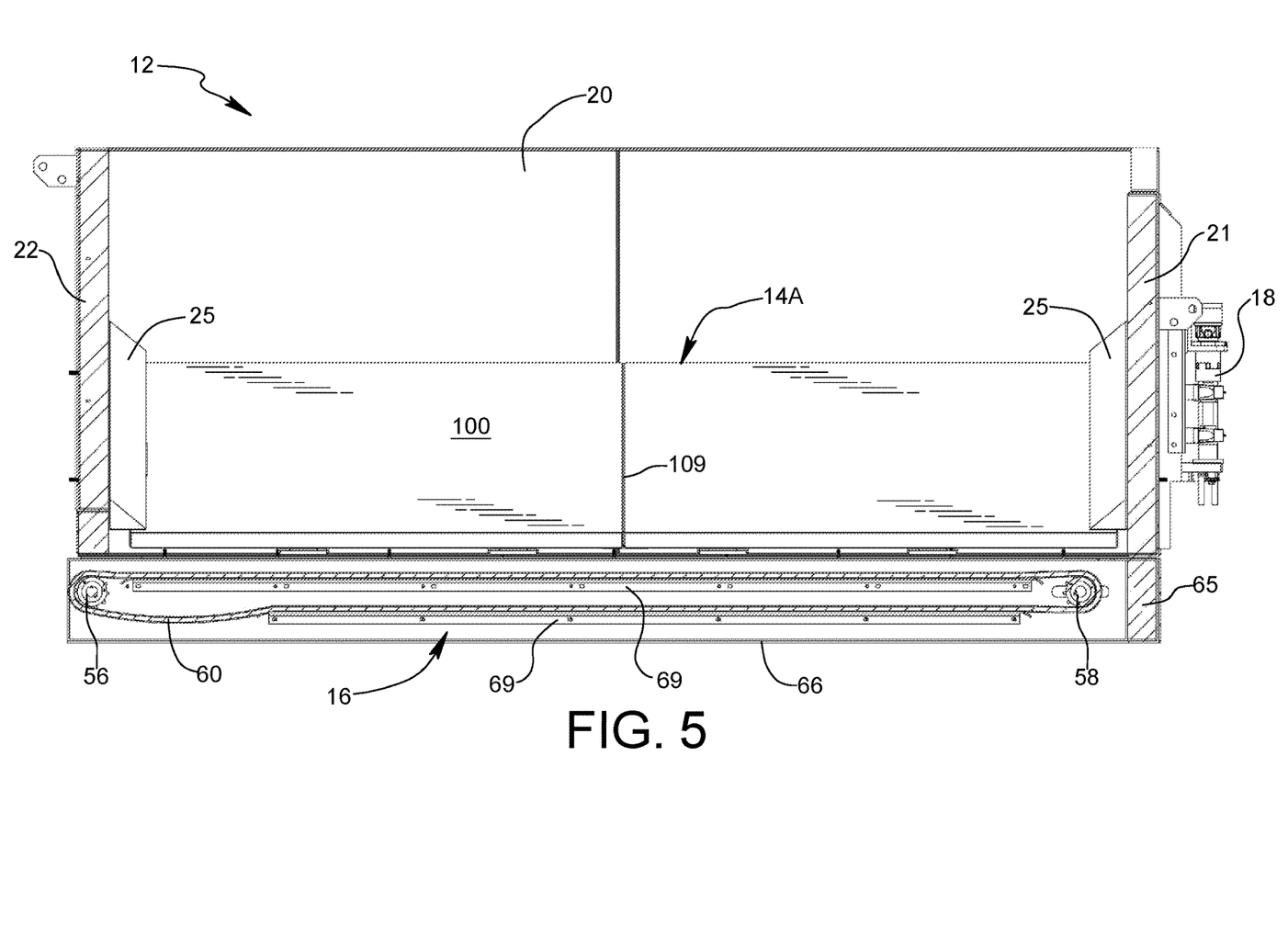
FIG. 5 is a longitudinal cross-sectional view of the firebox and conveyor system assembly shown in FIG. 3.

Biochar apparatus 10 may comprise a chassis 80 designed to facilitate transport of the apparats to and from work sites where biomass is cleared and incinerated. Chassis 80 may include a front end 81 and a rear end 83, wherein firebox 12 is carried by chassis 80 and conveyor system 16 is operable to convey the pieces of biochar to rear end 84 of chassis 80 and discharge the pieces of biochar from the conveyor system at the rear end of the chassis. Rear end 83 of chassis 80 may include a transverse gap 85 for allowing the pieces of biochar to be discharged from conveyor system. 16. Chassis 80 may be in the form of a trailer having a trailer frame 82, wheels 84, and a front hitch coupling 86 for connecting the trailer to a vehicle, such as a truck (not shown). Transverse gap 85 may be provided in trailer frame 82 by having a raised rear member 87 as shown in FIG. 1.

Instead of a wheeled trailer, chassis 80 may take the form of a truck, or a vehicle propelled by engine-driven continuous tracks (i.e., caterpillar tracks) for navigating difficult terrain.

In order to provide an open area in chassis 80 for accommodating firebox 12, wheels 84 may be mounted on respective independent torsion axles 88 fixed to outer side members of trailer frame 82. Independent torsion axles 88 may be formed by cutting a commercially available torsion axle and welding the cut-off portion to an associated side member of trailer frame 82. Chassis 80 may include an equipment deck 90 arranged and configured to support mechanical equipment and user interface controls for apparatus 10 such as fan 30, engine 32, fuel tank 34, a control console 31, and a hydraulic pump system 35. In the illustrated embodiment, equipment deck 90 is located on trailer frame 82 between front hitch coupling 86 and front wall 21 of firebox 12, however other arrangements are possible.

Firebox 12 may be adjustably mounted on chassis 80 for upward and downward movement relative to the chassis, whereby firebox 12 and other portions of apparatus 10 attached to firebox 12 may be selectively raised off the ground for transport and lowered onto the ground for use. In the illustrated embodiment, firebox 12 is mounted on the frame 82 of chassis 80 by a pair of hydraulically powered linear actuators 27, one at a centered location adjacent front wall 21 and the other at a centered location adjacent rear wall 22. Actuators 27 may be connected to hydraulic system 35. Chassis 80 may include a plurality of firebox guide rollers 92 positioned to engage respective corners of firebox 12 to reduce friction between firebox 12 and frame 82 as the firebox is moved up and down relative to the frame. For example, guide rollers 92 may be mounted on structural members of 82. Guide rollers 92 also serve to limit contact area between firebox 12 and frame 82 to minimize heat transfer between the firebox and frame, and help maintain alignment of the firebox with respect to the frame. While the illustrated embodiment employs hydraulically powered linear actuators 27 for raising and lower firebox 12, other means may be employed, such as a cable and winch system.

As illustrated in FIG. 1, biochar apparatus 10 may further comprise a quenching reservoir pan 94 adjacent the discharge end 52 of conveyor system 16, and a drainage basket 96 removably received by the quenching reservoir pan 94, wherein the pieces of biochar are discharged from conveyor system 16 to drainage basket 96 and quenching reservoir pan 98. Quenching reservoir pan 94 holds a supply of a quenching liquid, for example water, to quench the hot pieces of biochar discharged from conveyor system 16. Quenching reservoir pan 94 may have a pair of handles 95, and drainage basket 96 may have a pair of handles 97, to facilitate handling. As will be understood, drainage basket 96 comprises a porous mesh having drainage openings sized to retain the pieces of biochar but allow the quenching liquid to remain in reservoir pan 94. Thus, when drainage basket 96 is filled with biochar pieces, it may be manually removed from reservoir pan 94, emptied at a desired location, and returned into reservoir pan 94 such that the existing quenching liquid may be reused. As shown in the illustrated embodiment, quenching reservoir pan 94 may have a width corresponding to a width of conveyor belt 60, and drainage basket 96 may have a width dimensioned for close fit within the width of quenching reservoir pan 94. Quenching reservoir pan 94 may have a length slightly greater than a length of drainage basket 96 to receive the drainage basket in close fit, as shown in FIG. 1, or reservoir pan 94 may have a length substantially greater than the length of drainage basket 96 to hold more quenching liquid. The depth of quenching liquid in reservoir pan 94 may be set in accordance with the size of biochar pieces to be quenched, and each biochar piece may be quenched almost independently. As will be appreciated, quenching reservoir pan 94 and drainage basket 96 provide significant advantages over prior art quenching methods in which pellets are bathed in a deep water bath or are sprayed with a flow of quenching liquid. In the prior art methods, a lot of quenching liquid is lost in excess evaporation and excess absorption into the biochar. The present quenching scheme significantly reduces the amount of quenching liquid needed, facilitates reuse of the quenching liquid, and minimizes the amount of smoke and vapor produced in quenching. Tests by applicant show that quenching by way of quenching reservoir pan 94 and drainage basket 96 uses about half the quenching water of other systems, a feature that is very important and beneficial in remote forest locations.

In the foregoing disclosure, and by way of non-limiting example, thermo-ceramic refractory material 106, and thermo-ceramic material used to make refractory panels 24 and 68, may be Regular Castable, Service limit 3000 degrees F., Cold Crushing Strength per ASTM C133 4000 psi. Of course, other refractory materials may be used without straying from the present disclosure.

While the present disclosure describes exemplary embodiments, the detailed description is not intended to limit the scope of the appended claims to the particular embodiments set forth. The claims are intended to cover such alternatives, modifications and equivalents of the described embodiments as may be included within the scope of the claims.

What is claimed is:

1. An apparatus comprising:
   a firebox for containing biomass to be incinerated to produce biochar;
   a first panel and a second panel arranged in the firebox to support biomass contained in the firebox, the first panel including an upwardly facing first panel surface and the second panel including an upwardly facing second panel surface, the first panel surface and the second panel surface converging downwardly toward one another, wherein the first panel surface and the second panel surface are separated by an extraction gap between a bottom edge of the first panel surface and a bottom edge of the second panel surface;
   a roller system arranged to support the first panel for rolling movement relative to the firebox;
   an actuator connected to the first panel, wherein the actuator is operable to move the first panel relative to the firebox upon the roller system; and
   a conveyor system under the extraction gap;
   wherein the extraction gap is elongated in a longitudinal direction of the firebox;
   wherein the first panel includes a downwardly facing undersurface and a plurality of ribs fixed to the undersurface, wherein the plurality of ribs are engaged by the roller system;
   wherein the roller system includes a plurality of rollers mounted to rotate about a plurality of laterally extending roller axes, each of the plurality of rollers including a circumferential groove, and the plurality of ribs extend parallel to the longitudinal axis of the firebox and are received by the circumferential groove of at least one of the plurality of rollers, whereby the first panel is guided for longitudinally directed rolling movement relative to the firebox; and
   wherein pieces of the biochar pass through the extraction gap to the conveyor system, and the conveyor system is operable to convey and discharge the pieces of biochar from the conveyor system.

2. The apparatus according to claim 1, wherein the first panel includes refractory material and the second panel includes refractory material.

3. The apparatus according to claim 2, wherein the first panel surface includes a surface of the refractory material of the first panel, and the second panel surface includes a surface of the refractory material of the second panel.

4. The apparatus according to claim 1, wherein the extraction gap extends along a central longitudinal axis of the firebox.

5. The apparatus according to claim 1, wherein the undersurface of the first panel is a planar surface inclined at 45° relative to horizontal, the plurality of ribs comprise lengths of rectangular tubing having a face in surface-to-surface engagement with the undersurface, and the circumferential groove of each of the plurality of rollers is V-shaped to receive a corner of one of the plurality of ribs.

6. The apparatus according to claim 1, wherein the roller system includes a plurality of rollers mounted to rotate about a plurality roller axes including a horizontally extending first roller axis at a first height within the firebox and a horizontally extending second roller axis at a second height within the firebox different from the first height, and wherein the plurality of rollers includes a first set of rollers rotatable about the first roller axis and a second set of rollers rotatable about the second roller axis.

7. The apparatus according to claim 6, wherein the roller system includes a plurality of roller support brackets, each roller support bracket supporting a roller from the first set of rollers and a roller from the second set of rollers.

8. The apparatus according to claim 1, wherein the extraction gap is approximately one inch wide.

9. The apparatus according to claim 1, wherein the roller system is further arranged to support the second panel for rolling movement relative to the firebox.

10. The apparatus according to claim 9, wherein the actuator is further connected to the second panel and is operable to move the second panel relative to the firebox upon the roller system.

11. The apparatus according to claim 9, further comprising another actuator, wherein the another actuator is connected to the second panel and is operable to move the second panel relative to the firebox upon the roller system.

* * * * *